B. MORGAN.
TEST OR PRIMING COCK.
APPLICATION FILED JAN. 16, 1913.
1,085,990.
Patented Feb. 3, 1914.
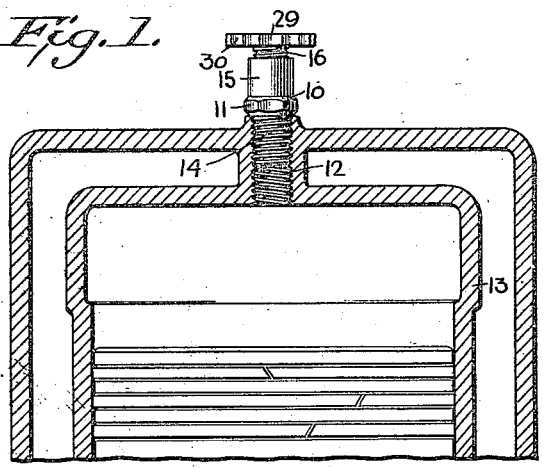
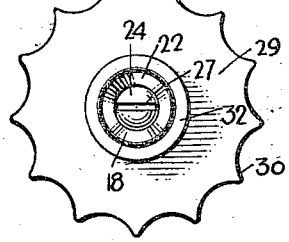
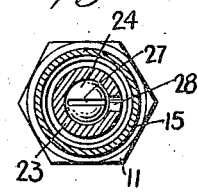
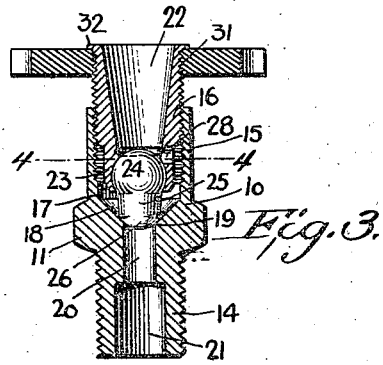
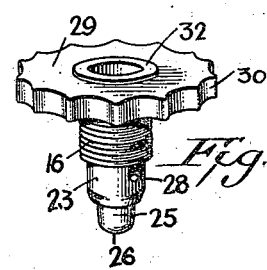
WITNESSES
INVENTOR
BERNARD MORGAN
BY
ATTORNEYS

UNITED STATES PATENT OFFICE.

BERNARD MORGAN, OF NEWPORT, RHODE ISLAND.

TEST OR PRIMING COCK.

1,085,990. Specification of Letters Patent. Patented Feb. 3, 1914.

Application filed January 16, 1913. Serial No. 742,430.

*To all whom it may concern:*

Be it known that I, BERNARD MORGAN, a subject of the King of Great Britain, and a resident of Newport, in the county of Newport and State of Rhode Island, have invented certain new and useful Improvements in Test or Priming Cocks, of which the following is a full, clear, and exact description.

This invention relates to test or priming cocks for use with the cylinders of internal combustion engines or for other like purposes, and has reference more particularly to a device of this class which comprises a cylinder plug, and a closing plug movably associated with the cylinder plug, the cylinder plug affording means for the introduction of an explosive fluid into the cylinder upon which the device is mounted, and having a valve-seat, the closing plug having a self-centering valve-seat-engaging part adapted to close the cylinder plug.

The invention also relates to a test or priming cock having two relatively movable plugs, one of which is provided with a manipulating part fashioned from material which will not readily transmit heat.

The invention further relates to a device of the class in question in which the cylinder plug has a valve-seat, and the closing valve has a movable valve-seat-engaging part which can be operated to grind the valve-seat to insure a proper, tight fit of the parts.

The object of the invention is to provide a simple and inexpensive test or priming cock, by means of which a suitable quantity of gasolene or explosive fluid can be conveniently introduced into the combustion chamber of an explosive engine, for testing or priming purposes, which can be tightly closed to seal the combustion chamber, which can be readily manipulated without danger of burning the fingers, due to the transmission of heat from the cylinder to the device itself, in which the valve-seat-engaging member is automatically self-centering, whereby a tight joint is insured, and which affords means for conveniently grinding in the valve-seat by means of the valve-seat-engaging member, without taking the device apart or even removing it from the cylinder.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1 is a vertical section of the upper part of the cylinder of an internal combustion engine having an embodiment of my invention applied thereto; Fig. 2 is an enlarged plan view of the device; Fig. 3 is a longitudinal section of the preferred embodiment of the test or priming cock; Fig. 4 is a transverse section on the line 4—4 of Fig. 1; and Fig. 5 is a perspective view of the closing plug of the device.

Before proceeding to a more detailed explanation of my invention it should be clearly understood that the present form of the device constitutes an improvement upon that shown in my United States Patent No. 982,009, dated January 17, 1911. In the present improved construction I provide, as will appear more clearly hereinafter, a self-centering relation of the valve-seat and the valve-seat-engaging part; the latter, furthermore, affords means for grinding in the valve.

Certain of the details of construction shown for example herewith, form no part of the invention and can be varied in accordance with individual preference and special conditions, without departing from the underlying spirit of the invention.

Referring more particularly to the drawings, I have shown for example, a test or priming cock consisting of a cylinder plug 10 having in the middle thereof a radial enlargement 11 of angular cross-section, to permit the device to be easily manipulated by means of a wrench or similar tool in screwing it into place in the threaded cylinder head opening 12 of the combustion chamber 13 of an engine. The lower part 14 of the cylinder plug is suitably threaded for the purpose. The upper portion 15 of the cylinder plug is internally threaded to receive the correspondingly externally threaded closing plug 16. The recess or opening 17 in the upper part of the cylinder plug terminates at its lower end in a tapered valve-seat 18 having a valve opening 19 which communicates with a passage or bore 20 having an enlargement 21 and extending through the central and lower portions of the cylinder plug.

The closing plug has a preferably tapered passage or opening 22 in the upper part thereof which constitutes a reservoir and a fluid conduit. At its lower end the closing plug has a substantially cylindrical neck 23 which communicates internally with the passage 22 and is of spherical curvature at the inside, to receive the correspondingly rounded head 24 of a valve head or valve-seat-engaging member 25, the latter having the lower end 26 suitably formed to fit snugly against the valve-seat. The valve-seat-ening member has a limited freedom of movement in all directions and can thus adjust and center itself with respect to the valve-seat when the closing plug is being screwed against the valve-seat.

The upper, rounded part of the valve-seat-engaging member is provided with a transverse groove or kerf 27 adapted to receive the end of a screw-driver or similar tool introduced through the passage 22, so that the valve-seat-engaging member can be rotated to grind the valve-seat in the usual manner without removing any part of the device. The part 23 of the closing plug has a lateral opening 28 which communicates with the passage 22 and permits fluid to escape from the passage 22 into the recess 17 of the cylinder plug. Subsequently, if the closing plug is manipulated to displace the valve-seat-engaging member from the valve-seat, the explosive fluid can flow through the passage 20 and the enlargement 21 thereof, into the combustion chamber of the engine. The operation of the device in the present case is the same as that of the priming cock shown in my patent referred to above.

To facilitate the manipulation of the closing plug I provide a knob or handle 29 in the form of a disk having a roughened or serrated edge 30. The disk is provided with a central, threaded opening 31 by means of which it is mounted on the threaded closing plug. At the upper edge a laterally disposed flange 32 is provided which is pressed against the disk 29 and assists in securing the same in position. The disk is fashioned from indurated fiber, hard rubber or any other similar material adapted for the purpose, which will not readily transmit heat from the metal cylinder and closing plugs to the hand of the operator of the device. It will be readily appreciated that after an internal combustion engine has been operated for any length of time the combustion chamber becomes heated to a high degree, and this heat is of course readily transmitted to the metallic priming cock itself. It is therefore of great advantage to have the manipulating grip or handle of the priming cock of such material that the heat will not in turn be transmitted to the hand of the user to cause injury thereto. The valve-seat-engaging member and the threaded body are joined together by means of a ball and socket joint and thereby form an articulated plug.

Having thus described my invention, I claim as new, and desire to secure by Letters Patent:—

1. A device of the class described comprising a plug having a bore therethrough, and a valve-seat in said bore concentric with same and intermediate the ends of said plug, and an articulated closing plug comprising a body member associated with said bore of said closing plug and having a bore therethrough, and a seat-engaging member adapted to engage said seat in said plug, said body member having a socket spherical in shape, and said valve-seat-engaging member having a spherical portion engaging said socket, said spherical portion having means whereby said valve-seat-engaging member can be turned in said socket without removing any part of the device and thereby grind said valve seat.

2. A device of the class described comprising a plug having a bore therethrough, a valve-seat in said bore concentric with same and intermediate the ends of said plug, and an articulated closing plug comprising a body member engaging said bore of said plug and concentric with same, and a valve-seat-engaging member axial with said body member adapted to engage said seat in said plug, said body member and said valve-seat-engaging member having a ball and socket connection, said body member having a central bore therethrough closed by said valve-seat-engaging member, and a side opening in said body member connecting said bore within said body member with the bore in said plug above said valve-seat, said valve seat engaging member having a slot in its ball portion facing the central bore and in said body member and adapted to be engaged by a screw-driver to said central bore, whereby said valve seat can be ground without removing any part of the device.

3. A device of the class described comprising a plug having a bore and a valve seat; an articulated closing plug comprising two members, one having a bore therethrough and movably associated with the other of said members, the latter forming a valve head and being permanently associated with the first mentioned member, said valve head having means whereby it can be operated to grind said valve seat when all the parts are in the normal relative position, access being had to said valve head through said bore of said first member.

In testimony whereof I have signed my name to this specification in the presence of two subscribing witnesses.

BERNARD MORGAN.

Witnesses:
A. E. SNYDER,
REMINGTON WARD.